Patented Feb. 28, 1933

1,899,064

UNITED STATES PATENT OFFICE

OLIVER W. STOREY, OF MADISON, WISCONSIN, AND CHARLES ALBERT SILVER, LATE OF MADISON, WISCONSIN, BY BERTHA SILVER, ADMINISTRATRIX, OF MADISON, WISCONSIN, ASSIGNORS TO C. F. BURGESS LABORATORIES, INC., OF MADISON, WISCONSIN, A CORPORATION OF DELAWARE

MANUFACTURE OF ELECTRODES

No Drawing. Continuation of application Serial No. 42,029, filed July 7, 1925. This application filed July 3, 1928, Serial No. 290,263, and in Germany July 1, 1926.

This invention relates to the manufacture of electrodes particularly adapted for use in the electrochemical production of solid carbon oxide or oxides having the properties of graphitic oxide and more particularly to the production of such electrodes from crushed or powdered graphitic carbon.

In a copending application of Bruce K. Brown, Serial No. 42,091, filed July 7, 1925 (now Patent No. 1,639,980, granted August 23, 1927), there is disclosed a novel method of electrochemical oxidation which eliminates the use of strong acids and the danger of explosions. Brown's method may be briefly described as follows:—Carbonaceous material is mounted as an anode in an oxidizing electrolyte, such as 30% nitric acid at about room temperature, and an electric current having a density of about 10 amperes per square foot of anode surface is passed through. The anode disintegrates to a sludge which is a mixture of carbon and oxide of carbon and may contain as high as 6% by weight of available oxygen. Carbon so oxidized does not have the yellow color of pure graphitic oxide but has the dull black appearance of partially oxidized carbon and it apparently is identical or approximately identical with the product obtained by chemical oxidation. The yields are comparatively high so that the oxide of carbon may be made by this method at a low cost compared to straight chemical methods. However, Brown's electrochemical method contemplates the use of the solid graphite anodes of commerce, which are expensive when compared to pulverized or crushed graphite of the same purity. Our novel method eliminates the use of these solid baked graphite anodes and substitutes therefor comparatively cheap anodes made from pulverized or crushed graphite and a binder.

Although solid graphite anodes give excellent results when used under proper conditions as ascertained by Bruce K. Brown, these baked solid anodes have the disadvantage of high initial cost. It is possible to utilize powdered or crushed graphite by our new method. Such powdered or crushed graphite may be purchased at a comparatively low cost.

The inventors found that it is possible to mold without baking, powdered graphite and a suitable binder into an anode which is conductive enough to carry the current utilized in the electrolytic cell, without undue resistance.

The ordinary graphite and carbon anodes and electrodes of commerce are made by molding suitable graphite and carbon with a binder and subsequently baking at a high temperature to drive off the volatile portions and then carbonize or graphitize the non-volatile portions into carbon or graphite so that the anode or electrode becomes more or less homogeneous and the resistance drops to the desired amount. Their method eliminates the baking process and retains the binder per se.

If powdered graphite, or a mixture of graphite and non-graphitic carbonaceous material is mixed with a material which is solid at atmospheric temperatures but is a liquid of low viscosity at higher temperatures, and is then pressed hot in a mold and allowed to cool under pressure in the mold, the excess liquid binder being expressed from the mixture while hot, the balance forms a solid article having the appearance and some of the properties of a graphite article made by the ordinary baking process. By their method about 10 to 15 per cent of organic binders are usually retained in the molded article, the exact amount depending upon the screen analysis of the crushed graphite, the character of the binder, and the pressure used. A pressure of 1000 pounds per square inch gives satisfactory results and anodes so made have a sufficiently low resistance. Higher pressures may be used and a pressure of 5000 pounds per square inch gives a molded product whose electrical resistance is approximately equal to that of the ordinary baked carbon rod. The binder is of much importance since its properties determine whether the molded product is suited to the subsequent electrolytic oxidation operation.

The function of the binder is two fold. Electrochemical oxidation and disintegration of a graphite anode that has been saturated with paraffin or similar wax produces a solid oxide of carbon with a much higher oxygen content than when the anode has not been so saturated. Saturation also results in a much better corrosion, by eliminating coarse particles. The saturants confine the oxidation of the graphite to the surface of the anode exposed to the electrolyte by preventing the entrance of the electrolyte to the interior of the anode. By using a suitable binder it will serve not only to hold the graphite particles together but in addition will insure a uniform corrosion of the anode and a high oxygen content in the resulting oxide of carbon.

The binder not only must have a melting point above atmospheric temperature but its melting point must also be higher than the temperature of the electrolytic bath in which the anode is to be used. Such baths may be run at temperatures as high as 60° C., above which it has been found that the yield of oxide of carbon is practically nil. The electrolyte is best kept at about 20° to 30° C. Not only must the melting point of the binder be above the temperature of the electrolyte but the softening point must also be above this temperature. It has been found that some binders make an excellent anode when first pressed, but on standing for a few hours the anodes begin to swell and tend to disintegrate, the binder apparently being too soft to withstand the internal stresses developed in the anode by the high pressure. Such anodes, when used in an electrolytic bath at room temperatures, disintegrate into undesirable coarse pieces. Ordinary refined white paraffin makes an excellent anode binder when the anode is first pressed but the anode swells slightly when allowed to stand at room temperatures or slightly above. Such an anode gives excellent results if the electrolytic bath is kept somewhat below room temperature, but, due to the formation of coarse lumps, gives much poorer results at room temperatures.

Ceresin is similar to paraffin, while candelilla wax makes an excellent binder but is objectionable because of its high cost. Shellac makes an excellent binder but is costly. Rosin, either as produced or as hardened by lime, manganese oxide, zinc oxide, or other hardeners, may be used as a binder with excellent results and at a low cost. The rosin can be pulverized and intimately mixed with the pulverized graphite before the mixture is introduced into the mold for pressing. Rubber may be used as a binder, it being possible to vulcanize the rubber during the molding operation by mixing in sulphur, with or without a suitable accelerator. Sulphur alone can also be used as a binder. Ordinary pitch is too viscous, as it contains too much free carbon and produces an anode with a high resistance. The binder should preferably have a low viscosity at the molding temperature.

The above examples show that a wide range of organic and inorganic substances may be used as binders. While the organic binders apparently are better suited to the purpose inorganic binders, in addition to sulphur, are available, such as low melting point fusible slags, water glass, etc.

The binder should preferably be a water repellent, although a slight water solubility may not be detrimental. The binder should not dissolve more rapidly than the graphite is oxidized by the anodic action, for thereby the oxidation is confined to the surface of the anode exposed to the electrolyte. This keeps the product in a fine state of division. The binder must also be unattacked or only slightly attacked by the oxidizing electrolyte at the temperature of the bath and under certain conditions below 60° C. Generally, the electrolyte contains nitric acid in varying strength, with or without the addition of other salts, the nitric acid strength generally being under 50 per cent. When paraffin is used as a binder, it is not attacked or only slightly by the anodic action. The paraffin is recovered from the resulting oxide of carbon by suitable extraction methods, benzole being one of several suitable solvents. The paraffin thus recovered may be used again. This extra operation is objectionable from an operating standpoint. This operation may be eliminated by using a binder which becomes water soluble or disintegrates due to the anodic action. Rosin or hardened rosin are such binders. Oxide of carbon made by oxidizing pulverized graphite molded into an anode using these binders is wetted by water, while oxide of carbon made from a paraffin bound anode is not wet by water. This is of importance in making dry battery mixes. Although the rosin bound particles are wet by water, they no doubt do contain a small percentage of rosin oxidation or disintegration products. These may be removed by a suitable solvent such as benzol, carbon tetrachloride, alcohol or gasoline. If these oxidation products are not objectionable in later operations, they need not be removed. Most of the water soluble oxidation products are washed out by the water washing which is necessary to remove the electrolyte from the oxide of carbon.

When sulphur is used as the binder, it is partially oxidized and partially disintegrated by anodic action, the amount oxidized being a function of the current density. The electrolyte shows the presence of sulphates when a high current density is used.

The sizes of the crushed graphite particles and their relative amounts are of importance. A pulverized or crushed graphite ground so that most of the particles pass through a 100 mesh screen may be easily molded into a dense, hard anode which oxidizes readily with the formation of a finely powdered oxide of carbon. If a coarsely crushed graphite is used so that all of the particles through 65 mesh are removed, the resulting oxide of carbon contains a much smaller percent of oxygen. If on the other hand graphite is ground to 20 mesh and all of the fines are retained, and an anode is made of this product, the resulting oxide of carbon contains a high percent of oxygen and the disintegration closely resembles that of an anode made from finely pulverized graphite.

These results show that the anode should preferably be made entirely from finely pulverized or crushed graphite or from a coarser graphite which contains proportionate quantities of the more finely pulverized sizes so that there are a minimum of voids to be filled by the binder. This makes it possible to crush or grind graphite so that the product passes through a coarse screen, say 10 mesh, and to utilize the entire product containing the coarse and fine sizes directly in the manufacture of the anodes. This allows waste graphite such as stub ends of electrodes and anodes, turnings, etc., to be used by subjecting them to a simple crushing or grinding operation. The unoxidized ends of the crushed graphite anodes used in the process of making oxide of carbon may be recrushed and then remolded into new anodes by merely heating the crushed anode stubs high enough to melt the binder, adding new graphite and binder when necessary, thus completely utilizing the graphite.

By their process it not only becomes possible to completely utilize a cheap grade of graphite, but, in addition the anode corrosion is even and is not subject to the uneven corrosion encountered with baked graphite anodes saturated with a moisture repellent such as paraffine. Such an uneven corrosion results in the discarding of anodes before being corroded to the usual maximum.

The pulverized graphite anodes can be molded into those shapes which give the best corrosion and the anode hooks can also be molded into the graphite.

The oxide of carbon resulting from the electro-chemical oxidation of pulverized graphite molded into an anode with a binder appears to be of as high a quality as that made by the electrochemical oxidation of the usual baked graphite. It responds to the same chemical tests and is of the same appearance.

In a copending application of Storey and Collinson filed July 7th, 1925, Serial No. 42,111, (now Patent No. 1,639,981, granted August 23, 1928), there is disclosed and claimed a method of producing pulverous oxidized carbon in which a carbon anode which has been treated to confine the oxidation to its surface is submitted to an electric current in a bath having an oxidizing, oxygen containing anion.

This application is a continuation of the application of Oliver W. Storey and Charles Albert Silver, deceased, Serial No. 42,029, filed July 7, 1925.

What is claimed is:

The method of making an anode of high electrical conductivity for electrolytic processes wherein said anode is disintegrated which consists in molding and pressing an electrode from pulverized graphite finer than ten mesh and fused rosin that has been treated with a hardener, removing any excess rosin during said pressing operation, and allowing said rosin to solidify while said mixture is under pressure, said pressure being high enough to secure the desired conductivity.

In testimony whereof we affix our signatures.

OLIVER W. STOREY.
BERTHA SILVER,
Special Administratrix of Charles Albert Silver, Deceased.